United States Patent
Wang et al.

(10) Patent No.: US 9,160,967 B2
(45) Date of Patent: Oct. 13, 2015

(54) SIMULTANEOUS LANGUAGE INTERPRETATION DURING ONGOING VIDEO CONFERENCING

(71) Applicant: Cisco Technology, Inc., San Jose, CA (US)

(72) Inventors: Runnian Wang, Suzhou (CN); Zhen Li, Suzhou (CN); Hao Chen, Suzhou (CN); Pinru Cheng, Suzhou (CN)

(73) Assignee: Cisco Technology, Inc., San Jose, CA (US)

( * ) Notice: Subject to any disclaimer, the term of this patent is extended or adjusted under 35 U.S.C. 154(b) by 414 days.

(21) Appl. No.: 13/675,635

(22) Filed: Nov. 13, 2012

(65) Prior Publication Data

US 2014/0132701 A1    May 15, 2014

(51) Int. Cl.
| | |
|---|---|
| *H04N 7/14* | (2006.01) |
| *H04N 7/15* | (2006.01) |
| *H04L 12/18* | (2006.01) |
| *H04M 3/56* | (2006.01) |
| *G06F 17/28* | (2006.01) |

(52) U.S. Cl.
CPC .............. *H04N 7/15* (2013.01); *G06F 17/289* (2013.01); *H04L 12/1827* (2013.01); *H04M 3/56* (2013.01); *H04N 7/155* (2013.01); *H04N 7/157* (2013.01); *H04M 2203/2061* (2013.01); *H04M 2242/12* (2013.01)

(58) Field of Classification Search
CPC ............. H04L 12/1827; G06F 17/289; H04M 2203/50; H04M 2203/509
USPC .................... 348/14.01–14.16; 370/259–271, 370/351–357; 379/67.1–88.28, 201.01, 379/202.01–207.01; 704/270–278; 709/201–207, 217–248
See application file for complete search history.

(56) References Cited

U.S. PATENT DOCUMENTS

| | | | | |
|---|---|---|---|---|
| 5,963,892 | A * | 10/1999 | Tanaka et al. | 704/2 |
| 6,816,468 | B1 * | 11/2004 | Cruickshank | 370/260 |
| 8,175,244 | B1 | 5/2012 | Frankel | |
| 2003/0009342 | A1 * | 1/2003 | Haley | 704/276 |
| 2003/0125927 | A1 * | 7/2003 | Seme | 704/3 |
| 2004/0092293 | A1 | 5/2004 | Lee et al. | |
| 2005/0172232 | A1 * | 8/2005 | Wiseman | 715/718 |

(Continued)

OTHER PUBLICATIONS http://www.universelanguage.com/simultaneous-interpretation/equipment.html visited on Aug. 31, 2012.

(Continued)

*Primary Examiner* — Hemant Patel
(74) *Attorney, Agent, or Firm* — Edell, Shapiro & Finnan, LLC (57) ABSTRACT

A video conference session is established between a plurality of meeting clients, where each meeting client includes a computing device that communicates via a network and at least one host server with computing devices of other meeting clients. A presenter is established for the video conference session, where the presenter includes at least one of the meeting clients, and audio and video content generated from the presenter is provided to other meeting clients within a base room of the video conference session, where the presenter provides audio content to the base room in a first language. In response to at least one meeting client selecting a translation of the audio content from the presenter from the first language into a second language, audio content is provided to the at least one meeting client in the second language during the ongoing video conference session.

13 Claims, 8 Drawing Sheets

(56) References Cited

U.S. PATENT DOCUMENTS

| | | | |
|---|---|---|---|
| 2006/0120307 A1* | 6/2006 | Sahashi | 370/259 |
| 2007/0143103 A1* | 6/2007 | Asthana et al. | 704/200 |
| 2008/0077390 A1* | 3/2008 | Nagao | 704/7 |
| 2008/0300852 A1* | 12/2008 | Johnson et al. | 704/2 |
| 2010/0150331 A1* | 6/2010 | Gitelis et al. | 379/202.01 |
| 2010/0283829 A1* | 11/2010 | De Beer et al. | 348/14.09 |
| 2011/0238407 A1* | 9/2011 | Kent | 704/3 |
| 2011/0246172 A1* | 10/2011 | Liberman et al. | 704/2 |
| 2011/0279639 A1* | 11/2011 | Anand et al. | 348/14.09 |
| 2013/0030789 A1* | 1/2013 | Dalce | 704/2 |
| 2013/0226557 A1* | 8/2013 | Uszkoreit et al. | 704/3 |

OTHER PUBLICATIONS http://en.wikipedia.org/wiki/United_Nations_Interpretation_Service#Modern-day_conference_interpreting visited on Aug. 31, 2012.

http://www.streamingmedia.com/Webevents/details.aspx?eventID=390&src=real4 visited on Aug. 31, 2012.

International Search Report and Written Opinion in counterpart International Application No. PCT/US2013/069063, mailed Jan. 28, 2014, 9 pages.

* cited by examiner

SIMULTANEOUS LANGUAGE INTERPRETATION DURING ONGOING VIDEO CONFERENCING

TECHNICAL FIELD

The present disclosure relates to video conferencing and, in particular, video conferencing between multiple participants speaking different languages.

BACKGROUND

Video conferencing has become increasingly important, e.g., in business and other environments, as businesses or relationships between entities continually increase and expand vast distances within and between countries. Due to the distances between groups of people, a meeting via video conferencing between groups of people at different locations becomes more convenient instead of requiring groups to travel to a common meeting point.

While video conferencing is beneficial in bringing together groups of people for meetings that may be great distances from each other, language barriers that may exist between certain groups engaged in the video conference (e.g., for two groups of people having a meeting from two different language speaking countries) can present difficulties in effective communications occurring within a video meeting.

DESCRIPTION OF EXAMPLE EMBODIMENTS

Overview

Techniques are described herein for establishing, via at least one host server, a video conference session between a plurality of meeting clients, where each meeting client comprises a computing device that communicates via a network with the at least one host server and computing devices of other meeting clients. A presenter is established for the video conference session, where the presenter comprises at least one of the meeting clients, and audio and video content generated from the presenter is provided to other meeting clients within a base room of the video conference session, where the presenter provides audio content to the base room in a first language. In response to at least one meeting client selecting a translation of the audio content from the presenter from the first language into a second language, audio content is provided to the at least one meeting client in the second language during the ongoing video conference session.

Example Embodiments

Techniques are described herein for facilitating the generation of private rooms within an ongoing video conference session within a networking platform (e.g., a collaboration platform) in which one or more presenters are providing audio and video content to other meeting clients attending the ongoing conference session. Any meeting client can request a private room session in which a sub-presenter presents a modified version of the audio and/or video content generated by a presenter within the ongoing video conference session. This is particularly useful in scenarios in which a meeting client desires to receive audio content for the video conference session in another language (i.e., the meeting presenter's audio content is translated into another language). In particular, a meeting client can select an alternative language with which to receive audio content within the ongoing video conference session, where a sub-presenter translates the audio content from the current presenter of the conference session into a different language, and the translated audio content is then presented to the meeting client within a private room. As described herein, the sub-presenter can further implement and control a time lag associated with the video content provided by the presenter so as to ensure that any graphical presentations (e.g., showing of slides, show of data within one or more graphs, etc.) within the video content provided to the private room corresponds with the translated audio content being provided by the sub-presenter.

A video conference session is implemented herein utilizing any suitable networking platform that hosts the conference session, in which meeting clients communicate with each other and exchange information via the platform. Each meeting client refers to a participant of the platform that operates within the platform using a suitable computing device. An example of a suitable networking platform in which a video conference session can be hosted comprises a collaboration platform. A collaboration platform provides software tools or software application modules and related services that link meeting clients so as to allow the meeting clients to communicate with each other in a variety of different ways (e.g., via email, instant messaging, audio and/or video conferencing, etc.) and share content (e.g., documents, blogs, or any other types of forms of information) via the platform, including the sharing of content via a video conference session (e.g., a presenter shares screen content, such as a slide presentation, a graph or chart of data, etc. during the video conference session). The term "tool" is used herein to refer to an "application" software function or set of functions provided by one or more software application on a computing device and/or hosted on a server on behalf of a computing device. Application modules refer to a set of one or more software applications that provide the software tools used by the computing devices and/or servers.

Some elements or features of a collaboration platform can include messaging (e.g., email, calendaring and scheduling, contact lists, etc.), team collaboration features (e.g., synchronization of documents or files common to a particular community or group associated with the files, including posted or edited web logs or blogs, wikis, other forms of written ideas and/or notes, etc.), and real time or near real time communications (e.g., instant messaging, short messaging service or SMS, web conferencing, white boarding, screen content or desktop sharing, voice, audio and/or video conferencing, etc.). In particular, a collaboration platform allows meeting clients to engage in a video conference session, where one or more meeting clients can serve as presenters of audio and video content during the video conference session. For example, a video conference session may begin with a first presenter, which is a meeting client of the video conference session, where other presenters may then be designated during the ongoing conference session (e.g., the presentation shifts from a first presenter to a second presenter, then to a third presenter, then back to the first presenter, etc., during the ongoing video conference session).

Referring to FIGS. 1-4, block diagrams are shown for an example system 2 that supports the implementation of a video conference session within a suitable networking environment, in particular a collaboration platform, in which a plurality of meeting clients communicate and exchange information with each other. Examples of types of networks that can be utilized within system 2 to facilitate communications and exchange of audio and video content as well as other information between two or more computing devices include, without limitation, any one or more of local or wide area networks, Internet Protocol (IP) networks such as intranet or internet networks, telephone networks (e.g., public switched telephone networks), wireless or mobile phone or cellular networks, and any suitable combinations thereof.

Figure 1:
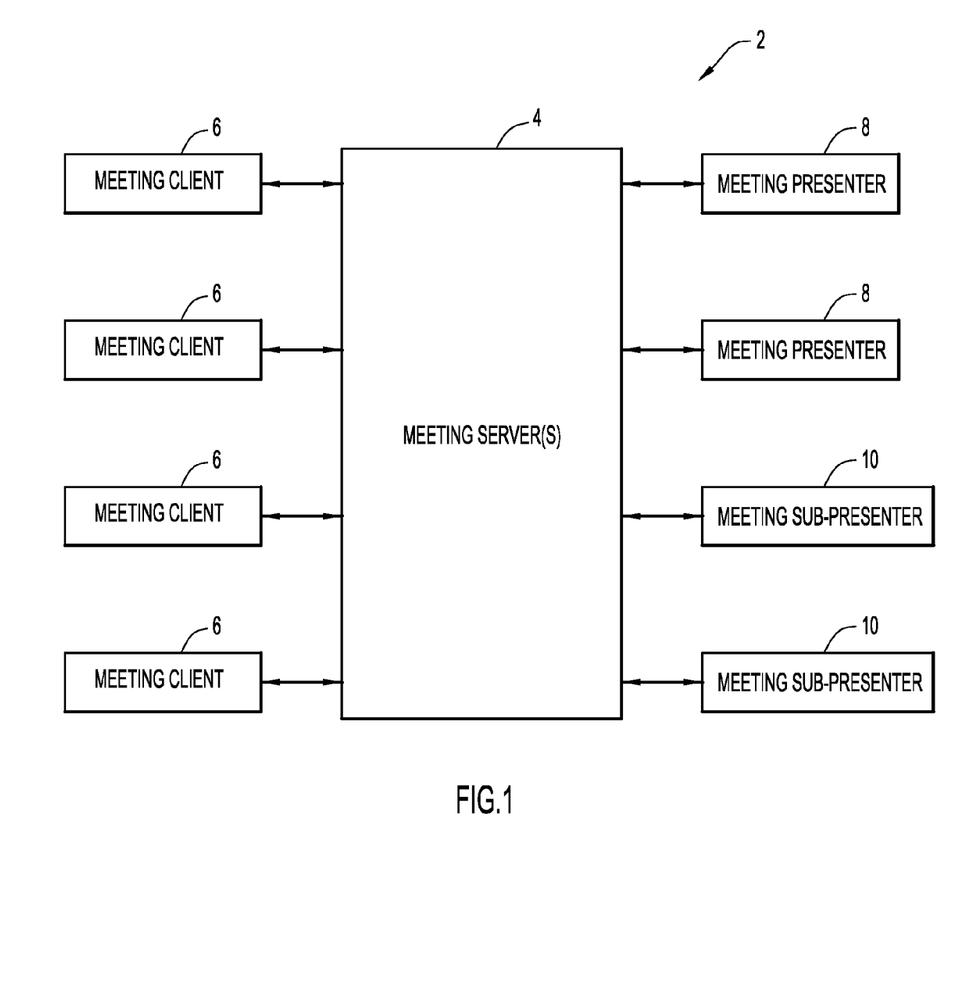
FIG. 1 is a schematic block diagram of an example system in which meeting clients and meeting presenters connect via one or more meeting servers within a networking environment to engage in a video meeting.

Referring to FIG. 1, the system 2 comprises a network that facilitates communications and exchange of communications and content between a plurality of meeting clients 6. The communications of the meeting clients 6 are hosted by one or more meeting servers 4. In addition, one or more meeting presenters 8 and sub-presenters 10 are designated throughout a particular video conference session. The meeting presenters 8 generate audio and video content for broadcasting and sharing with the other meeting clients of the conference session at any given time during the session, where the meeting presenters 8 can also become meeting clients 6 in that they also receive audio and video content for the ongoing conference session from other meeting presenters 8 (or sub-presenters 10) when they are not personally generating audio and video content for the session. It is noted that any suitable number of meeting clients, meeting presenters and sub-presenters can join together in a video conference session, and the specific number of each as shown in FIG. 1 is for example purposes only.

The network of the system 2 can include one or more host servers (e.g., a collaboration server, and audio and video servers as described herein) that include suitable software applications to support the collaboration platform in a client/server relationship with the meeting clients 6, meeting presenters 8 and sub-presenters 10, where the meeting clients/presenters/sub-presenters also include one or more suitable collaboration software applications that facilitate communications and exchange of information with each other via the host server(s). Alternatively, the collaboration platform can be supported in any other suitable manner, in which one or more client devices include one or more collaboration software applications that facilitate a suitable connection with other client devices over the network to provide communications and exchange of information associated with the collaboration platform. Thus, the collaboration platform exists over client/meeting/sub-presenter devices as well as the meeting server(s) that connect with each other via the network.

Figure 2:
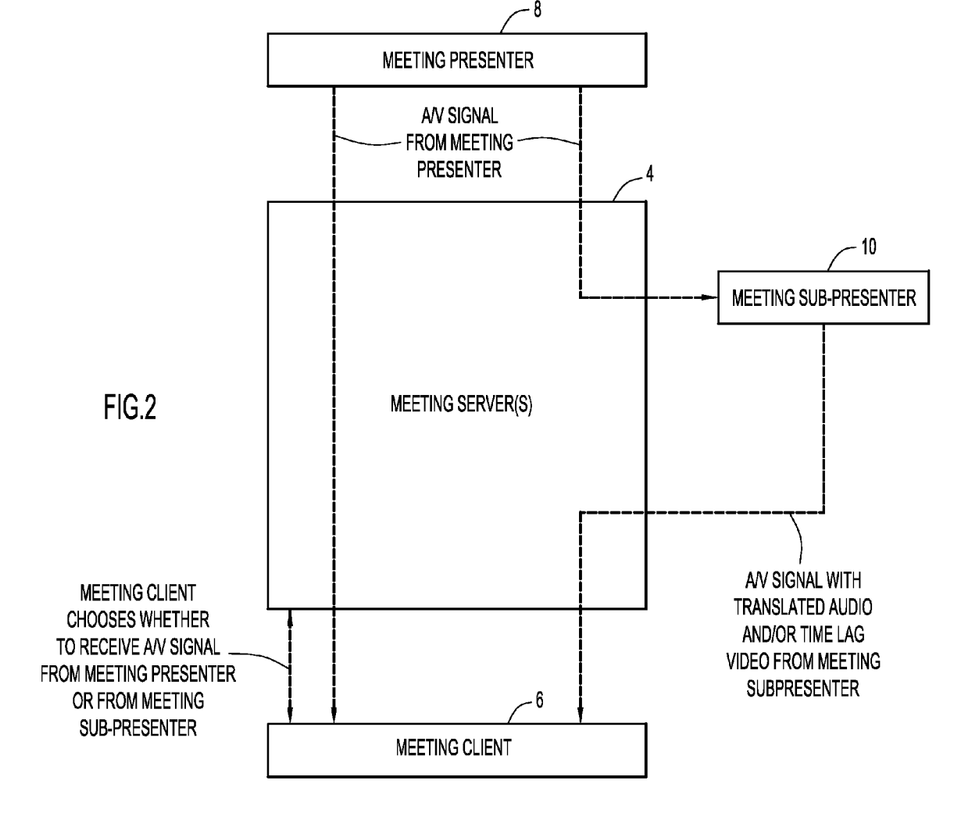
FIG. 2 is a schematic block diagram of an example embodiment showing how a meeting client can switch between a main channel in which the meeting client receives audio and video content from a meeting presenter and a private channel in which the meeting client receives audio and video content associated with the same meeting from a meeting sub-presenter.

A general depiction in FIG. 2 shows the flow of audio and video content between a meeting presenter 8 and a meeting client 6 within the collaboration platform during an ongoing video conference session utilizing the techniques as described herein. In particular, a meeting presenter 8 provides audio and video content to meeting clients 6 within a base room hosted by one or more meeting server(s) 4 during any given time of the ongoing video conference session. A meeting client 6 receives both audio and video content generated by the meeting presenter 8 via the one or more meeting servers 4 (via A/V signals as shown in FIG. 2). At any given time, the meeting client 6 may choose to enter a private room of the ongoing video conference session (also hosted by the one or more meeting server(s) 4) so as to receive audio and video content from a meeting sub-presenter 10. For example, the meeting presenter 8 may be speaking in a first language that is foreign to the meeting client 6, and the meeting client 6 may desired to have the audio content generated by the meeting presenter 8 translated into a second language (e.g., translated from French into English). The meeting client 6 makes a request, via one or more meeting servers 4, to have such audio content provided in another specified language. This results in the meeting client 6 being transferred to a private room within the ongoing video conference session so as to receive audio and video content from the private room hosted by the meeting server(s) 4. A sub-presenter 10 provides audio and video content to the meeting client 6 (via A/V signals as shown in FIG. 2) within the private room. The sub-presenter 10 receives audio and video content from the meeting presenter 8 in the presenter's (first) language (e.g., via the base room), generates translated audio content into the other (second) language associated with the private room, and the translated audio content of the sub-presenter 10 is then provided along with the video content of the meeting presenter 8 to the meeting client 6 within the private room as hosted by the meeting server(s) 4. As further described herein, the sub-presenter 10 can control the flow of video content from the meeting presenter 8 to the meeting client 6, in particular by time-shifting or generating a time lag associated with the video content, in order to ensure that the video content corresponds or syncs with the translated audio content of the sub-presenter 10. In other words, the video content provided by the sub-presenter 10 within the private room is time shifted (e.g., by two or more seconds) in relation to video content provided by the meeting presenter 8 in the base room.

Figure 3:
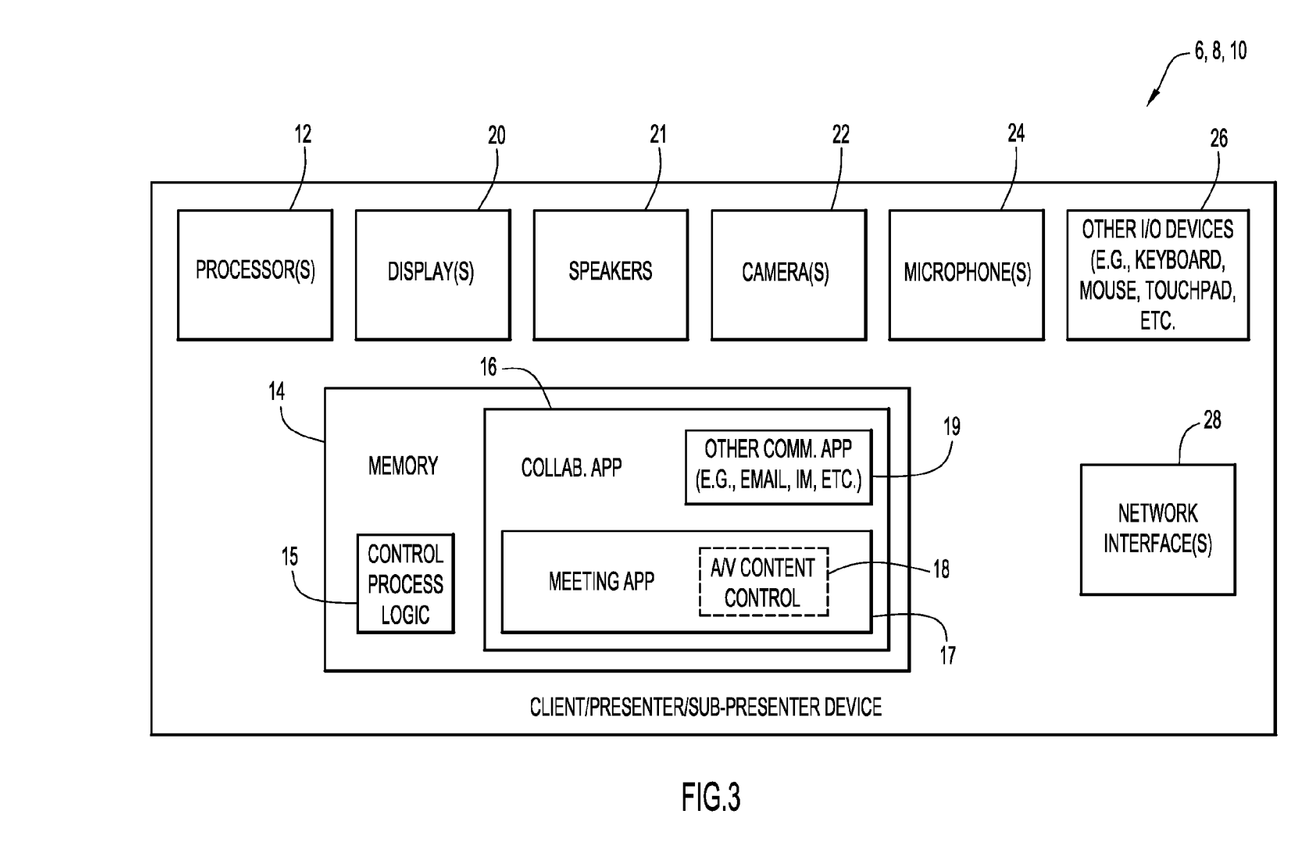
FIG. 3 is a schematic block diagram of an example embodiment of a meeting client, presenter or a sub-presenter associated with the system of FIG. 1.

An example embodiment of a meeting client 6, a meeting presenter 8 and a meeting sub-presenter 10 is depicted in the block diagram of FIG. 3. Each of the meeting client, meeting presenter and meeting sub-presenter comprises one or more participants operating a computing device to facilitate exchange of audio content, video content and other information with other computing devices via the meeting server(s) 4 within the collaboration platform of the system 2. For example, a meeting client 6 may comprise a computing device associated with an individual participant that is engaging in a video conference session. Alternatively, a meeting client 6 may comprise one or more computing devices associated with a collaboration room supporting a plurality of participants engaging within a video conference session (e.g., a collaboration meeting room including seated participants, a local server and/or other computing devices with related cameras, microphones, displays and/or other input/output devices associated with the meeting room). A meeting presenter 8 and sub-presenter 10 can include a similar configuration as a meeting client 6, as shown in FIG. 3.

Each of the meeting client 6, meeting presenter 8 and meeting sub-presenter 10 includes at least one processor 12, a memory 14, one or more displays 20 to output video content, one or more speakers 21 to output audio content, one or more cameras 22 to capture and record video content for sharing and broadcasting to other meeting clients during a video conference session, one or more microphones 24 to capture and record audio content for sharing and broadcasting to other meeting clients during a video conference session, as well as any other one or more types of input/output devices 26 (e.g., keyboards, mouse devices, touch pads, etc.) to facilitate the input or output of information to be communicated or exchanged over the collaboration platform. In addition, each of the meeting client 6, meeting presenter 8 and meeting sub-presenter 10 includes one or more network interfaces 28. The network interfaces 28 may comprise, e.g., one or more of an Ethernet interface card or switch, a modem, a router or any other suitable hardware device that facilitates a wireless and/or hardwire connection over the network with the meeting server(s) 4 and/or other computing devices associated with other meeting clients, meeting presenters and sub-presenters, where the network interface units can be integrated within a computing device or a peripheral that connects with a computing device.

Each of the processors 12 for the meeting client, meeting presenter and sub-presenter can comprise at least one microprocessor that executes control process logic instructions 15 stored within memory 14, including operational instructions and software applications, such as software applications associated with the collaboration platform and/or necessary to engage within a video conference session, stored within such memory. In particular, the processors 12 (as well as the processor(s) 36 of the meeting server(s) 4 described herein in relation to FIG. 4) perform operations in accordance with the steps set forth in the flow chart of FIG. 5 utilizing the meeting application tools and/or other enterprise collaboration application tools as described in further detail herein.

The memory 14 of each meeting client, meeting presenter and sub-presenter includes a collaboration application module 16 that comprises one or more software applications that provide software tools to facilitate connection of the computing devices associated with the meeting client/meeting presenter/sub-presenter to the collaboration platform, via one or more meeting servers 4, and also engage in the various activities associated with the collaboration platform. In particular, the collaboration application module 16 includes software applications that facilitate various types of communications via the collaboration platform, including a meeting application module 17 comprising one or more software applications that enable engaging within a video conference session as well as facilitate various functional features for the meeting client/meeting presenter/sub-presenter within the video conferencing session. The collaboration application module 16 can also include one or more other communication application modules 19 comprising one or more software applications that facilitate other forms of communication of the meeting client/meeting presenter/sub-presenter (e.g., email, instant messaging, exchange of other communications, content or information) within the collaboration platform. The sub-presenter 10 is also provided with an audio/video content control application module 18 comprising one or more suitable software applications that facilitate control by the sub-presenter of audio and video content being presented within a private room associated with an ongoing video conference session in accordance with techniques described herein.

Figure 4:
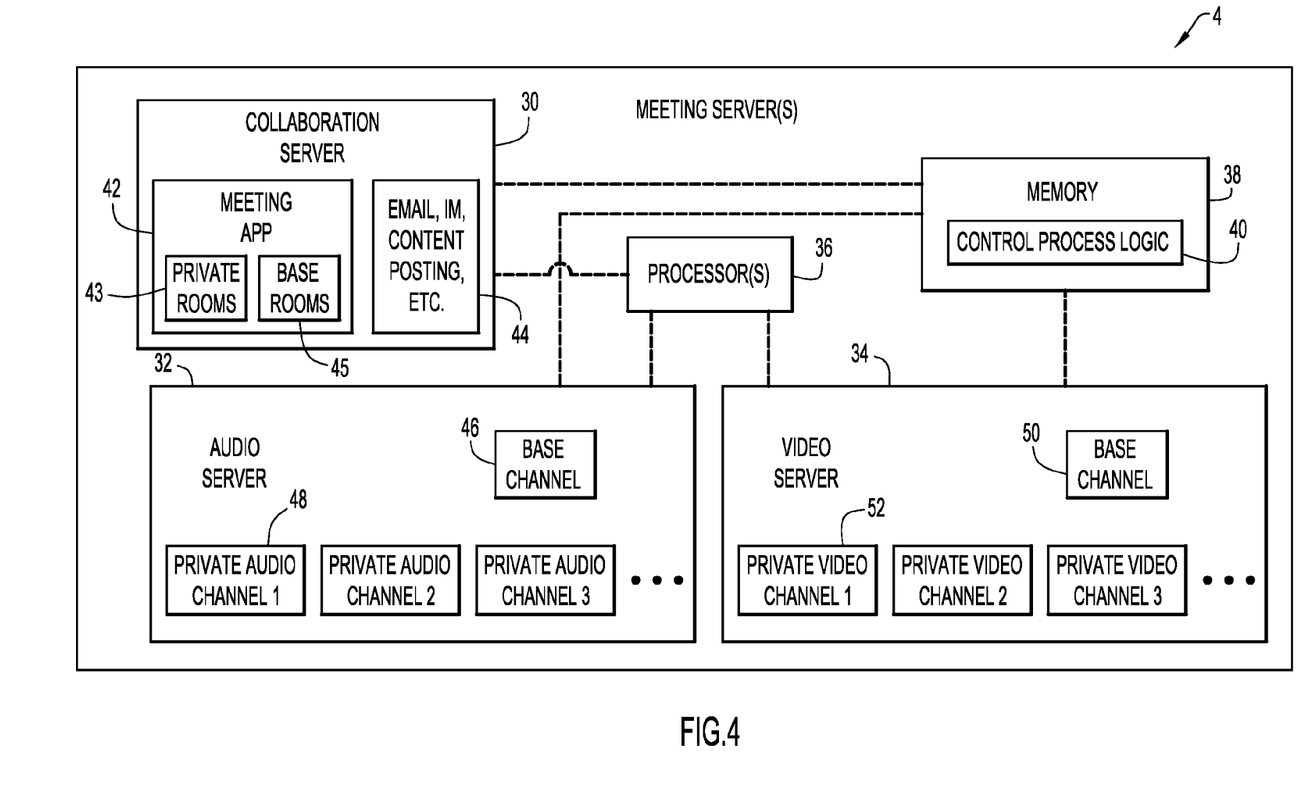
FIG. 4 is a schematic block diagram of an example embodiment of one or more meeting servers of the system of FIG. 1.

An example embodiment of one or more meeting server(s) 4 that host operations within the collaboration platform of the system 2, including the creation and implementation of ongoing video conference sessions, is depicted by the block diagram of FIG. 4. As shown in FIG. 4, one or more meeting servers 4 can comprise a collaboration server 30, an audio server 32 and a video server 34. Each of the servers includes one or more processors 36 and one or more memories 38 including control process logic instructions 40, where the processor(s) 36 can comprise at least one microprocessor that executes the control process logic instructions 40 to facilitate hosting operations associated with the collaboration platform, including the generation and operation of a video conference session as well as the establishment and operation of private rooms within an ongoing video conference session. It is noted that the collaboration server 30, audio server 32 and video server 34 can comprise separate servers that interact with each other as necessary to perform the various functions within the collaboration platform. Alternatively, the functions of each of the collaboration server 30, audio server 32 and video server 34 can be implemented within a single server system or within one or more common server systems such that the processor(s) 36 and memory or memories 38 are commonly accessible. The dashed lines to the processor(s) 36 and memory 38 by each of the servers 30, 32, 34 as shown in FIG. 4 represent both scenarios (where each server 30, 32, 34 is separate and includes its own processor and memory or, alternatively, the servers 30, 32, 34 are integrated as a single server system or common server systems sharing the same processor(s) and memory).

As part of its memory 38, the collaboration server 30 includes a meeting application module 42 comprising one or more software applications that facilitate hosting of operations within a video conference session for meeting clients 6, meeting presenters 8 and meeting sub-presenters 10. A base rooms application module 45 is provided as part of the meeting application module 42, which comprises one or more software applications that facilitate the generation and operation of base rooms within ongoing video conference sessions (e.g., to facilitate meeting clients 6 receiving audio and video content from meeting presenters 8 within the sessions). A private rooms application module 43 is also provided as part of the meeting application module 42, which comprises one or more software applications that facilitate the generation and operation of one or more private rooms within an ongoing video conference session (e.g., to facilitate a meeting client 6 receiving translated audio content by a sub-presenter 10 based upon audio content provided by a presenter 8 within the ongoing conference session). The memory 38 of the collaboration server 30 further includes at least one other application module 44 comprising one or more software applications that facilitate the hosting of functions associated with email communications, instant messaging, posting of content or other types of information by computing devices within the collaboration platform.

The audio server 32 includes a base channel module 46 comprising one or more software applications that facilitate providing audio content from a designated meeting presenter 8 to meeting clients 6 within a base room of an ongoing video conference session. Similarly, the video server 34 includes a base channel module 50 comprising one or more software applications that provide video content from a designated meeting presenter 8 to the meeting clients 6 within a base room of the ongoing video conference session. The audio server 32 further includes a private audio channel module 48 comprising one or more software applications that facilitate providing audio content from sub-presenters 10 to different private rooms that are accessible by meeting clients engaged within the ongoing video conference session. The video server 34 also includes a private video channel module 52 comprising one or more software applications that facilitate providing video content from sub-presenters 10 to the different private rooms, where the video content is controlled by a sub-presenter 10 for each private room (e.g., utilizing the A/V content control module 18 associated with a sub-presenter 10).

The memories 14, 38 of the meeting clients 6, meeting presenters 8, meeting sub-presenters 10 and meeting server(s) 4 may comprise read only memory (ROM), random access memory (RAM), magnetic disk storage media devices, optical storage media devices, flash memory devices, electrical, optical, or other physical/tangible memory storage devices, and any combinations thereof. Thus, in general, the memories may comprise one or more tangible (non-transitory) computer readable storage media (e.g., a memory device) encoded with software comprising computer executable instructions and when the software is executed (by the processors) it is operable to perform the operations described herein for a collaboration platform, including video conference sessions.

Some examples of computing devices that can be used for meeting clients, meeting presenters and meeting sub-presenters include, without limitation, stationary (e.g., desktop) computers, personal mobile computer devices such as laptops, note pads, tablets, personal data assistant (PDA) devices, and other portable media player devices, and cell phones (e.g., smartphones) including suitable input and output devices as described above. Suitable meeting servers can be any suitable types of stationary or other types of computing devices capable of hosting and managing multiple collaboration sessions of varying types simultaneously as well as large flows of data associated with the collaboration platform. Each server can be configured to provide the function of handling multiple video conferencing sessions simultaneously as well as the management of multiple private rooms associated with video conference sessions.

The computing devices can utilize any suitable operating systems (e.g., Android, Windows, Mac OS, Symbian OS, RIM Blackberry OS, Linux, etc.) to facilitate interaction, activities and engaging in video conference sessions via the collaboration platform. Examples of commercial software products and associated services that provide the general services and functional features associated with collaboration platforms or other networking environments for and facilitating video communication sessions between meeting clients include, without limitation, Cisco Quad (Cisco Systems, Inc.), WebEx Connect (Cisco Systems, Inc.), Microsoft SharePoint (Microsoft Corporation) and LotusLive (IBM Corporation).

Figure 5:
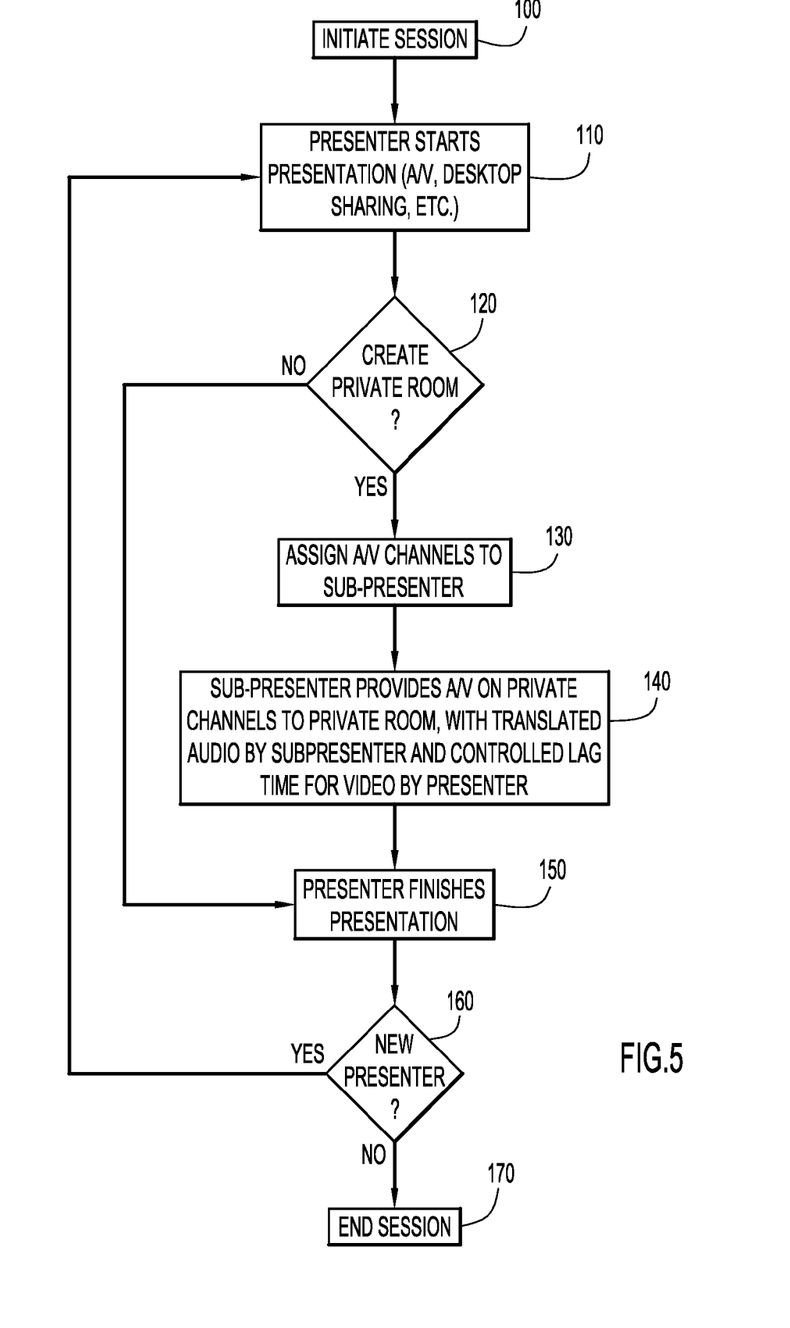
FIG. 5 is a flow chart depicting an example process for facilitating the creation of one or more private rooms during an ongoing video meeting so as to facilitate translation of audio content of the meeting during operation by the system of FIG. 1 and utilizing the techniques described herein.
Figure 6:
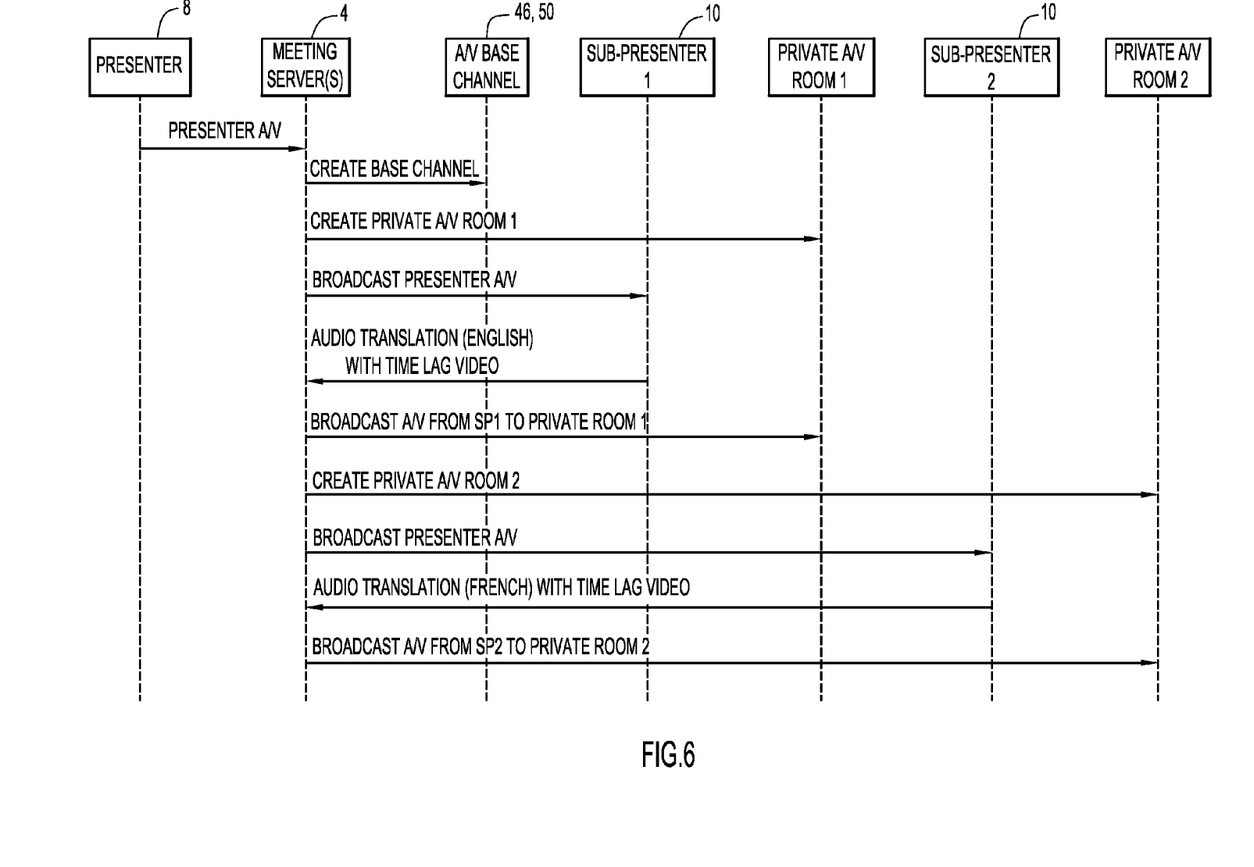
FIG. 6 is a diagram depicting the signal flow of audio and video content during a video meeting during operation by the system of FIG. 1 and utilizing the techniques described herein.

Operation of the collaboration platform to implement a video conference session utilizing the system 2 depicted in FIGS. 1-4 is now described with reference to the flow chart of FIG. 5 and the depiction of the flow of audio and video content of FIG. 6. At 100, a video conference session is initiated between meeting clients 6. The video conference session can be initiated in any suitable manner. In an example embodiment, meeting clients 6 are sent an invite (e.g., via email or some other form of communication) to join in a meeting at a set meeting time. At the meeting time, each meeting client 6 joins the video conference session by connecting via the server(s) 4, utilizing the meeting application module 17 of the meeting clients 6. For example, each meeting client 6 can connect with the video conference session within the collaboration platform by joining the meeting and providing the appropriate registration information (e.g., username, meeting number and/or password information) to provide access for the meeting client 6 to the video conference session. Each meeting client 6 (and meeting presenter 8 and sub-presenter 10) can be provided a suitable interface, such as a graphical user interface (GUI) as described herein and depicted in FIGS. 7 and 8, that provides the meeting client 6 with the ability to control viewing and hearing of audio and video content via speakers 21 and display(s) 20 as well as perform other operations within the video conference session.

At 110, a meeting presenter 8 starts the presentation, utilizing its meeting application module 17, by generating audio and video content that is broadcast to meeting clients 6 within a base room via the meeting server(s) 4. The start of the video conference session can occur, e.g., when a suitable number of meeting clients 6 have joined the session. The meeting presenter 8 can be any of the meeting clients 6 having been designated as a presenter. As previously noted, the meeting presenter 8 can change throughout the video conference session. The designated meeting presenter 8 generates audio content via the microphone(s) 24 and video content via the camera(s) 22 of the meeting presenter 8 and provides the content to the meeting server(s) 4. In addition, video content can be generated comprising one or more software applications that display content via a display 20 of the presenter 8 (e.g., desktop sharing of some or all portions of a display), where the presenter 8 may be sharing content such as graphs, charts, slides from a slide presentation and/or any other types of graphic or text content from the presenter's display. In an example embodiment, the video content can comprise a split screen including a video display of the presenter (or some other video content captured by the camera(s) 22 of the presenter 8) and a video display of shared/desktop content from a computing device of the presenter 8.

In the example embodiment depicted in FIG. 4, the audio server 32 provides a base channel 46 and the video server 34 provides a base channel 50 for providing audio and video content to meeting clients 6 of the video conference session within a base room hosted by the collaboration server 30 (e.g., using base rooms module 45). Referring to FIG. 6, the meeting presenter 8 provides audio and video content to the meeting server(s) 4 (e.g., to the audio server 32 and the video server 34). The meeting server(s) 4 create a base audio channel 46 and a base video channel 50 that broadcast the audio and video content received from the meeting presenter 8 for access by the meeting clients 6. The collaboration server 30 communicates with the audio and video servers and provides access by the meeting clients 6 to the base audio and video channels 46, 50 in a base room during the video conference session.

In the example embodiment, the meeting presenter 8 provides audio content by speaking in a certain language (e.g., Japanese). At 120, an option is provided for one or more meeting clients 6 to create a private room within the video conference session. This option can be chosen, e.g., when a meeting client desires to hear audio content from the session in a language other than that which is being provided by the meeting presenter 8.

For example, there may be at least one meeting client 6 engaged in the video conference session that speaks a language other than the language presented by the meeting presenter 8 (e.g., English). The system 2 provides the ability for a meeting client 6 to select a language other than that which the meeting presenter 8 is speaking for receiving audio content associated with the video conference session. As depicted n FIG. 7, the meeting client 6 includes a GUI 200, provided by the meeting application module 17 of the meeting client 6 and displayed by a meeting client display 20 and interacts with one or more I/O devices 26 of the meeting client 6, that allows the meeting client 6 to control the viewing of content and perform certain features within the session. For example, the GUI 200 includes a menu bar 202 that provides certain drop-down menus for performing functions within the GUI 200 associated with the video conference session. A display 204 provides a visual display of the video content received (e.g., from the video base channel 50) from the meeting presenter 8. As can be seen in display 204, the video content is split to include a video image of a person (e.g., the presenter) and a video image of shared video content (e.g., a graph, chart, slide, etc. shared from the computing device of the meeting presenter 8). An attendee window 206 provides a listing of other attendees/meeting clients 6 attending the session, and an audio/video control window 208 is also provided that allows the meeting client 6 to control features such as audio volume, pausing, replaying, rewinding, fast forwarding (e.g., if not in real time), etc. within the video conference session.

Figure 7:
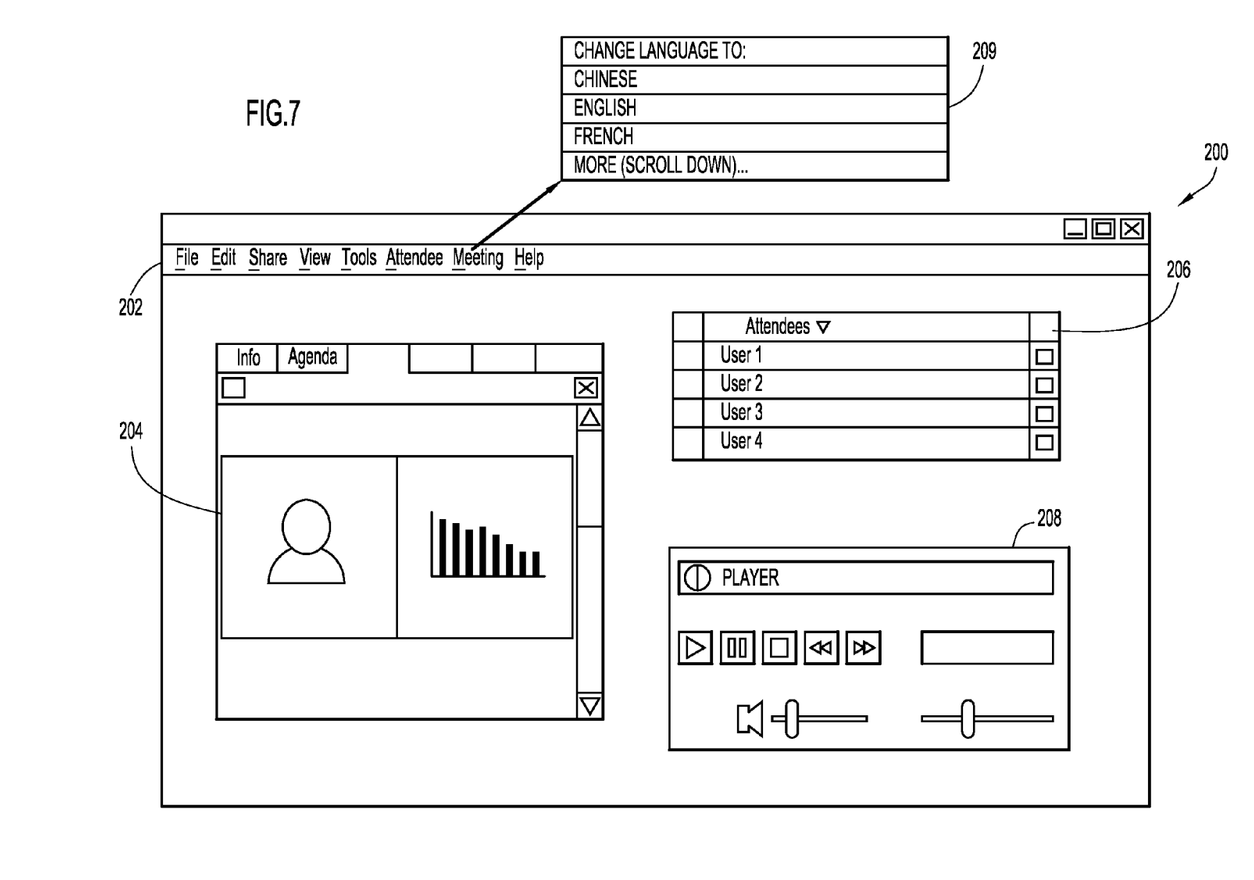
FIG. 7 depicts an example embodiment of a graphical user interface for a meeting client for use during a video meeting utilizing the system of FIG. 1 and the techniques described herein.

In the menu bar 202, a meeting designation allows the meeting client 6 to select a drop down menu 209, which further allows the meeting client 6 to select another language with which to hear audio content for the video conference session. When the meeting client 6 selects another language, that meeting client 6 is directed (e.g., via the collaboration server 30) to a specified private room that broadcasts audio content provided by a sub-presenter 10 in the language selected by the meeting client 6. For example, in response to a decision to create a private room, a private room is generated (e.g., by the private rooms module 43 of the collaboration server 30), and private audio and video channels (e.g., a private audio channel 48 and a private video channel 52) for the private room are assigned to a sub-presenter at 130. It is noted that a private room and corresponding private audio/video channels associated with a sub-presenter 10 can be generated at any select time before or during a video conference session, such as in response to a request by a meeting client 6 to receive audio content from the video conference session in another language, or at initiation of the session (e.g., based upon the known meeting clients attending the session and the known languages of the meeting clients and potential need for translations into other languages during the session).

In an example embodiment in which one or more private rooms are created at the initiation of a video conference session, private rooms can be generated and assigned to specific sub-presenters 10, where each sub-presenter translates from one or more languages of a meeting presenter 8 into one or more other specific languages. The generation of private rooms with corresponding sub-presenters 10 and options for different language translations can be initially established based upon the known group of the different speaking languages that may be involved in the session (e.g., English, Chinese, French, Japanese, etc., based upon a known group of meeting clients and meeting presenters). Thus, when a meeting client 6 decides to enter a private room to hear audio content in a specific language for the session, the private room already exists and a sub-presenter 10 is already providing audio and video content to the private room when the meeting client 6 enters this private room.

At 140, the sub-presenter 10 assigned to the private room provides audio content and video content via the private audio and video channels to the private room for broadcasting to the meeting client 6 associated with the private room (e.g., the meeting client 6 that requested, by selecting a language at drop down menu 209, audio content in the specific language associated with the private room). As shown in FIG. 6, a sub-presenter 10 translates audio content from the presenter 8 from one language (e.g., Japanese) into another language (e.g., English) and broadcasts the translated audio content via a private audio channel to a private audio/video room 1. As further shown in FIG. 6, the system 2 can also be configured to simultaneously provide audio content in other languages by other sub-presenters 10 to other private rooms (e.g., translated audio content in French from a sub-presenter to a private audio/video room 2) for access by other meeting clients 6 during the video conference session.

The sub-presenter 10 receives audio and video content from the base audio and video channels of the base room and provides its own audio content via the private audio channel to the private room for broadcasting to meeting clients selecting such private room. For example, the sub-presenter receives the audio content from the current presenter 8 in a first language (e.g., Japanese) and generates translated audio content in another language (e.g., English, French, etc.) via a microphone 24 of the sub-presenter 10. The translated audio content from the sub-presenter 10 and the same video content from the presenter 8 (i.e., the video content provided from the base video channel to the sub-presenter) are provided to the private room.

However, an issue that can occur, particularly when the presenter 8 is sharing desktop or other content from a display of a computing device while discussing such video content during the video conference session, is that the translation of the audio content by the sub-presenter 10 may shift by some amount of time with the video content. So, for example, the translated audio content can become offset in time in relation to a slide or other graphic that is being discussed by the presenter 8. If no adjustments are made, this would result in certain translated audio content not corresponding with the same slide, chart or other graphic of the video content within a private room. To account for this, the system 2 provides the sub-presenter 10 with the ability to generate a time lag in the video content provided by the presenter 8 such that the video content provided to the private room for broadcasting to a meeting client 6 is slightly time shifted or not in real time in relation to the same video content being broadcast to the base room (i.e., the video content that meeting clients 6 are receiving directly from the meeting presenter 8).

Figure 8:
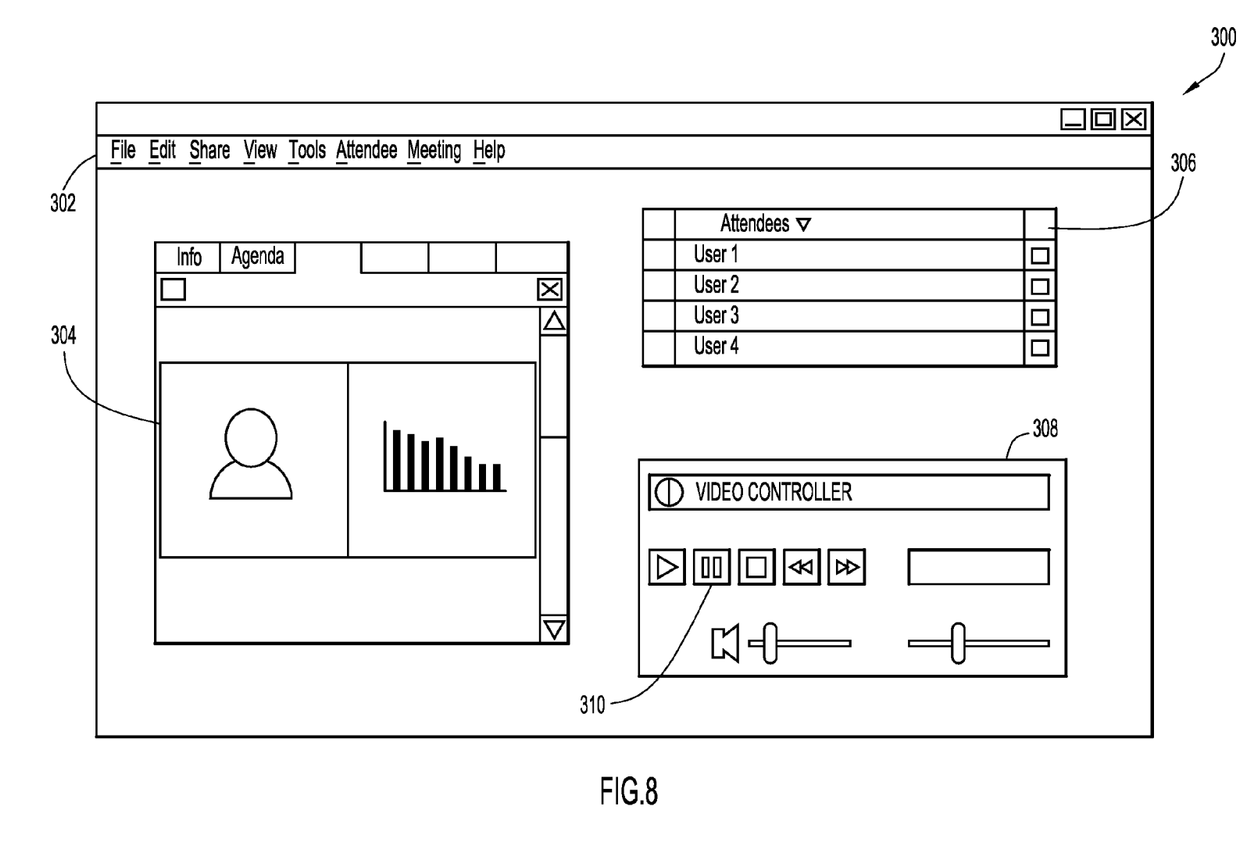
FIG. 8 depicts an example embodiment of a graphical user interface for a sub-presenter that translates audio content from a presenter during a video meeting utilizing the system of FIG. 1 and the techniques described herein.

This feature can be achieved by providing the sub-presenter 10 with a suitable interface, such as GUI 300 as depicted in FIG. 8, for use during the video conference session (e.g., via interaction between the GUI 300 and one or more I/O devices 26 of the sub-presenter 10). In particular, the sub-presenter's GUI 300 includes similar features as the GUI 200 for a meeting client, including a menu bar 302, a display 304, and an attendee window 306 (e.g., showing meeting clients 6 that are accessing the private room associated with the sub-presenter 10). The sub-presenter's GUI 300 also includes a video controller 308. The video controller 308 allows the sub-presenter 10, using control icons or buttons 310, to pause, stop, slow down (e.g., decrease the speed of the video content by a factor, such as 0.75×, 0.5×, 0.25×, etc. of the real-time speed of the video content) or speed up video content (e.g., increase the speed of the video content by a factor, such as 1.5×, 2×, etc. of the real-time speed of the video content) received from the video base channel (i.e., video content provided by the presenter 8) prior to being forwarded via a private video channel to the private room. Thus, the sub-presenter 10 can control the broadcast of the video content by the meeting presenter 8 of the video conference session so as to correspond with the translated audio content being generated by the sub-presenter 10. In particular, the sub-presenter 10 can implement a time lag in the video content (e.g., a time lag of 2 seconds or greater) provided to the private room in relation to the same video content being provided to the base room in order to ensure the video content corresponds with the sub-presenter's translated audio content.

For example, consider a scenario in which a meeting presenter 8 is providing video content in the form of a slide presentation while discussing the slides in an ongoing video conference session. The sub-presenter 10 providing translated audio content to a private room may have a difficult time listening to the audio content provided by the meeting presenter 8 while simultaneously attempting to translate such audio content so as to keep in sync with the slides of the video content. There will typically be a time lag that develops with translating the audio content from the meeting presenter 8 into a different language by the sub-presenter 10 for broadcasting to the private room. This time lag between audio content by the meeting presenter 8 and translated audio content by the sub-presenter 10 can further increase to some extent during a presentation by the meeting presenter 8. At some point, without having any control over the flow of the video content, the translated audio content of the sub-presenter 10 may become out of sync with the slides (e.g., the translated audio content may begin to lag and then increase in lag time behind slides by the presenter 8). By providing a sub-presenter 10 with the ability, via the video controller 308 of GUI 300, to stop, pause, slow down or generate a time lag for the video content of the presenter 8 (e.g. by activating a pause of the video content for a select time period, then continuing with play of the video content using buttons 310), the sub-presenter 10 can ensure the translated audio content corresponds with video content being provided to the meeting clients 6 within a private room. Further, if the translated audio content of the sub-presenter 10 "catches up" with the audio content of the meeting presenter 8 (e.g., the meeting presenter 8 pauses for a moment), the sub-presenter 10 also has the option of speeding up the video content to be sent to the private room.

Each meeting client engaged within a private room of the video conference session continues to receive audio and video content from the sub-presenter 10 of the private room while the presenter 8 provides audio and video content to the session. At 150, the current presenter 8 finishes a presentation. At 160, it is determined whether another or different presenter will be presenting audio and video content for the session. If there is another presenter, the next presenter starts the presentation and provides audio and video content to the base room, and the options once again exist for meeting clients to select one or more different private rooms, via a GUI 200 (so as to receive translated audio content associated with the next presenter's presentation). If there is no further presenter, the video conference session ends at 170.

Thus, the techniques described herein facilitate a video conference session in which meeting clients can receive alternative audio content (e.g., audio content translated into one or more specified languages) while the video conference session is ongoing. Each sub-presenter that translates the audio content is provided with the feature of generating a time lag between the video content and translated audio content in order to ensure the video content and translated audio content are synced with each other.

It is noted that any selected number of private rooms and corresponding sub-presenters can be provided to facilitate the option of receiving translated audio content in a selected number of different languages for meeting clients, based upon the known number of different languages that may be spoken during a given video conference session. Further, any suitable number of meeting clients can choose to receive audio and video content within the same private room for a given video conference session.

In addition, a private room assigned for a translated language may differ depending upon the language in which a presenter is providing audio content. For example, a private room that is assigned for translated audio content in English from a presenter presenting in Japanese may differ from a private room assigned for translated audio content in English from a presenter presenting in French (e.g., due to different sub-presenters being needed to translate from different languages into the same language).

The system may be configured such that a meeting client initially designates a single language with which to receive audio content during the video conference session. From the meeting client perspective, the system is configured such that the meeting client simply selects a language to receive audio content without selecting a specific private room. If the language of the presenter changes (e.g., from Japanese to French), the meeting client can be switched from one private room to another private room without any action required by the meeting client (e.g., the collaboration server switches broadcast of audio and video content to the meeting client from one private room to another) so as to ensure the meeting client continues to receive audio content for the session in a single language (e.g., English). Alternatively, if the language of a presenter changes from a language foreign to the meeting client into the single language designated by the meeting client (e.g., meeting presenters change during the session, where the language of the meeting presentation changes from Japanese to English, which is the designated language of the meeting client), the meeting client can be switched from the private room back into the base room so as to receive audio and video content generated directly from the meeting presenter. In these scenarios, the system is configured to identify which language the present meeting presenter is providing audio content (e.g., the collaboration server is configured to associate each meeting presenter server with a language identifier that indicates that language in which such meeting presenter will speak).

The above description is intended by way of example only.

What is claimed is:
1. A method comprising:
   establishing, via at least one host server, a video conference session between a plurality of meeting clients, each meeting client comprising a computing device that communicates via a network with the at least one host server and computing devices of other meeting clients;
   establishing a presenter for the video conference session, the presenter comprising at least one of the meeting clients;
   providing audio and video content generated from the presenter to other meeting clients within a base room of the video conference session, wherein the presenter provides audio content to the base room in a first language;
   assigning a sub-presenter to a private room associated with the video conference session;

providing audio and video content generated from the presenter to the sub-presenter;

facilitating control of audio and video content provided to the private room by the sub-presenter, wherein the sub-presenter generates and provides audio content along with video content generated from the presenter to the private room, the audio content generated by the sub-presenter comprising an audio broadcast of a translation of the audio content in the first language into a second language, wherein the facilitating control of the audio and video content provided to the private room by the sub-presenter comprises:

facilitating control by the sub-presenter of a time lag for the video content provided in the private room by providing the sub-presenter with a graphical user interface that allows the sub-presenter to perform at least one of pausing, slowing down and speeding up of the video content generated from the presenter to allow the sub-presenter to sync the video content with the audio content translated into the second language and being provided to the private room; and in response to at least one meeting client selecting a translation of the audio content from the presenter and in the first language into the second language, assigning the at least one meeting client selecting the second language in which to receive audio content to the private room such that the at least one meeting client receives audio and video content from the sub-presenter.

2. The method of claim 1, further comprising:
providing the at least one meeting client with an interface allowing the at least one meeting client to select the second language from a plurality of languages in which to receive a translation of the audio content in the first language during the ongoing video conference session.

3. The method of claim 1, wherein the facilitating control of audio and video content provided to the private room further comprises:
providing video content generated by the presenter at a time lag within the private room in relation to the same video content being provided within the base room.

4. The method of claim 1, further comprising:
in response to at least one further meeting client selecting a translation of the audio content in the first language to be translated into a third language during the ongoing video conference session, providing audio content to the at least one further meeting client in the third language during the ongoing video conference session simultaneously as the at least one meeting client is provided with audio content in the second language.

5. The method of claim 1, further comprising:
establishing a second presenter for the video conference session, the second presenter comprising at least one of the meeting clients;
providing audio and video content generated from the second presenter to other meeting clients within the base room of the video conference session, wherein the second presenter provides audio content to the base room in a third language; and
providing audio content to the at least one meeting client in the second language during the ongoing video conference session, wherein the audio content in the second language comprises a translation of the audio content in the third language.

6. An apparatus comprising:
a memory configured to store instructions including one or more meeting applications that facilitate initiation and operation of video conference sessions between a plurality of meeting clients; and
a processor configured to execute and control operations of the one or more meeting applications so as to:
establish a video conference session between a plurality of meeting clients, each meeting client comprising a computing device that communicates via a network with computing devices of other meeting clients;
establish a presenter for the video conference session, the presenter comprising at least one of the meeting clients;
provide audio and video content generated from the presenter to other meeting clients within a base room of the video conference session, wherein the presenter provides audio content to the base room in a first language;
assign a sub-presenter to a private room associated with the video conference session:
provide audio and video content generated from the presenter to the sub-presenter;
facilitate control of audio and video content provided to the private room by the sub-presenter, such that the sub-presenter generates and provides audio content along with video content generated from the presenter to the private room, the audio content generated by the sub-presenter comprising an audio broadcast of a translation of the audio content in the first language into a second language, wherein facilitating control of the audio and video content provided to the private room by the sub-presenter comprises:

facilitating control by the sub-presenter of a time lag for the video content provided in the private room by providing the sub-presenter with a graphical user interface that allows the sub-presenter to perform at least one of pausing, slowing down and speeding up of the video content generated from the presenter to allow the sub-presenter to sync the video content with the audio content translated into the second language and being provided to the private room; and in response to at least one meeting client selecting a translation of the audio content from the presenter and in the first language into the second language, assign the at least one meeting client selecting the second language in which to receive audio content to the private room such that the at least one meeting client receives audio and video content from the sub-presenter.

7. The apparatus of claim 6, wherein the processor is further configured to execute and control operations of the one or more meeting applications so as to:
provide the at least one meeting client with an interface allowing the at least one meeting client to select the second language from a plurality of languages in which to receive a translation of the audio content in the first language during the ongoing video conference session.

8. The apparatus of claim 6, wherein the processor is further configured to execute and control operations of the one or more meeting applications so as to:
in response to at least one further meeting client selecting a translation of the audio content in the first language to be translated into a third language during the ongoing video conference session, provide audio content to the at least one further meeting client in the third language during the ongoing video conference session simultaneously as the at least one meeting client is provided with audio content in the second language.

9. The apparatus of claim 6, wherein the processor is further configured to execute and control operations of the one or more meeting applications so as to:
- establish a second presenter for the video conference session, the second presenter comprising at least one of the meeting clients;
- provide audio and video content generated from the second presenter to other meeting clients within the base room of the video conference session, wherein the second presenter provides audio content to the base room in a third language; and
- provide audio content to the at least one meeting client in the second language during the ongoing video conference session, wherein the audio content in the second language comprises a translation of the audio content in the third language.

10. One or more computer readable storage device encoded with software comprising computer executable instructions and when the software is executed operable to:
- establish a video conference session between a plurality of meeting clients, each meeting client comprising a computing device that communicates via a network with computing devices of other meeting clients;
- establish a presenter for the video conference session, the presenter comprising at least one of the meeting clients;
- provide audio and video content generated from the presenter to other meeting clients within a base room of the video conference session, wherein the presenter provides audio content to the base room in a first language;
- assign a sub-presenter to a private room associated with the video conference session;
- provide audio and video content generated from the presenter to the sub-presenter;
- facilitate control of audio and video content provided to the private room by the sub-presenter, such that the sub-presenter generates and provides audio content along with video content generated from the presenter to the private room, the audio content generated by the sub-presenter comprising an audio broadcast of a translation of the audio content in the first language into a second language, wherein facilitating control of the audio and video content provided to the private room by the sub-presenter comprises:
  - facilitating control by the sub-presenter of a time lag for the video content provided in the private room by providing the sub-presenter with a graphical user interface that allows the sub-presenter to perform at least one of pausing, slowing down and speeding up of the video content generated from the presenter to allow the sub-presenter to sync the video content with the audio content translated into the second language and being provided to the private room; and
- in response to at least one meeting client selecting a translation of the audio content from the presenter and in the first language into the second language, assign the at least one meeting client selecting the second language in which to receive audio content to the private room such that the at least one meeting client receives audio and video content from the sub-presenter.

11. The computer readable storage device of claim 10, wherein the instructions are further operable to:
- provide the at least one meeting client with an interface allowing the at least one meeting client to select the second language from a plurality of languages in which to receive a translation of the audio content in the first language during the ongoing video conference session.

12. The computer readable storage device of claim 10, wherein the instructions are further operable to:
- in response to at least one further meeting client selecting a translation of the audio content in the first language to be translated into a third language during the ongoing video conference session, provide audio content to the at least one further meeting client in the third language during the ongoing video conference session simultaneously as the at least one meeting client is provided with audio content in the second language.

13. The computer readable storage device of claim 10, wherein the instructions are further operable to:
- establish a second presenter for the video conference session, the second presenter comprising at least one of the meeting clients;
- provide audio and video content generated from the second presenter to other meeting clients within the base room of the video conference session, wherein the second presenter provides audio content to the base room in a third language; and
- provide audio content to the at least one meeting client in the second language during the ongoing video conference session, wherein the audio content in the second language comprises a translation of the audio content in the third language.

* * * * *

UNITED STATES PATENT AND TRADEMARK OFFICE
CERTIFICATE OF CORRECTION

PATENT NO. : 9,160,967 B2  
APPLICATION NO. : 13/675635  
DATED : October 13, 2015  
INVENTOR(S) : Wang et al.

Page 1 of 1

It is certified that error appears in the above-identified patent and that said Letters Patent is hereby corrected as shown below:

In the claims
In Column 14, Line 18, change ":" to --;--.

Signed and Sealed this
Fifth Day of April, 2016

Michelle K. Lee
*Director of the United States Patent and Trademark Office*